United States Patent
Ijidakinro et al.

(10) Patent No.: US 9,548,883 B2
(45) Date of Patent: Jan. 17, 2017

(54) SUPPORT INCIDENT ROUTING

(75) Inventors: Ayodele A Ijidakinro, Redmond, WA (US); Eamon O'Reilly, Seattle, WA (US); William G. Burton, Bothell, WA (US); Ashwin K Sarin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2577 days.

(21) Appl. No.: 11/469,409

(22) Filed: Aug. 31, 2006

(65) Prior Publication Data

US 2008/0056233 A1 Mar. 6, 2008

(51) Int. Cl.
*H04M 3/00* (2006.01)
*H04L 29/06* (2006.01)
*H04M 3/51* (2006.01)

(52) U.S. Cl.
CPC ....... *H04L 29/06027* (2013.01); *H04L 65/103* (2013.01); *H04L 65/104* (2013.01); *H04L 65/4007* (2013.01); *H04M 3/5191* (2013.01)

(58) Field of Classification Search
CPC ..... H04M 3/523; H04M 7/006; H04M 7/1205
USPC .......................................... 379/265.01–266.1
See application file for complete search history.

(56) References Cited

U.S. PATENT DOCUMENTS

| | | | |
|---|---|---|---|
| 5,625,682 A * | 4/1997 | Gray et al. | 379/207.16 |
| 6,320,956 B1 | 11/2001 | Cherry | |
| 6,704,411 B1 | 3/2004 | Nishidate | |
| 6,714,642 B2 | 3/2004 | Dhir et al. | |
| 6,826,194 B1 | 11/2004 | Vered et al. | |
| 6,985,943 B2 | 1/2006 | Deryugin et al. | |
| 7,668,302 B1 * | 2/2010 | Beene et al. | 379/114.02 |
| 2002/0133392 A1 | 9/2002 | Angel et al. | |
| 2002/0196927 A1 * | 12/2002 | Johnson et al. | 379/265.02 |
| 2004/0141508 A1 | 7/2004 | Schoeneberger et al. | |
| 2005/0177380 A1 * | 8/2005 | Pritchard et al. | 705/1 |
| 2005/0195960 A1 * | 9/2005 | Shaffer et al. | 379/265.02 |
| 2005/0238162 A1 * | 10/2005 | Dezonno | 379/265.09 |
| 2006/0039547 A1 | 2/2006 | Klein et al. | |
| 2006/0056609 A1 | 3/2006 | Dickey | |
| 2006/0074603 A1 | 4/2006 | Matsunaga et al. | |
| 2006/0126820 A1 * | 6/2006 | Trandal | H04L 29/06027 379/373.01 |
| 2006/0221941 A1 * | 10/2006 | Kishinsky et al. | 370/352 |
| 2007/0124601 A1 * | 5/2007 | Singh | G06F 21/31 713/189 |

(Continued)

OTHER PUBLICATIONS

Feinberg, et al., "Operational determinants of caller satisfaction in the call center", International Journal of Service Industry Management, vol. 11, No. 2, 2000, pp. 131-141.

(Continued)

*Primary Examiner* — Solomon Bezuayehu
(74) *Attorney, Agent, or Firm* — Dan Choi; Micky Minhas; Lee & Hayes, PLLC

(57) ABSTRACT

Incident support routing is described. The Internet is utilized to distribute the received customer support calls among a plurality of customer support agents who may be remotely located and geographically distributed. Voice data to voice-over-IP (VOIP) data packet conversion and VOIP to voice conversion may be utilized to facilitate a customer support call between a customer's telephone and a customer support agent's computer system.

19 Claims, 11 Drawing Sheets

(56) References Cited

U.S. PATENT DOCUMENTS

2007/0160188 A1* 7/2007 Sharpe et al. ........... 379/265.01
2007/0280460 A1* 12/2007 Harris et al. ............. 379/201.01

OTHER PUBLICATIONS

Pichitlamken, et al., "Modelling and Simulation of a Telephone Call Center", Proceedings of the 2003 Winter Simulation Conference, pp. 1805-1812.
Tanir, et al., "Call Center Simulation in Bell Canada", Proceedings of the 1999 Winter Simulation Conference, pp. 1640-1647.
Whitt, "Dynamic Staffing in a Telephone Call Center Aiming to Immediately Answer All Calls", Operations Research Letters 24, 1999, pp. 205-212.

* cited by examiner

SUPPORT INCIDENT ROUTING

BACKGROUND

A large percentage of the cost associated with establishing a call-in customer support service is the cost of the infrastructure, which may include buildings, networks, phone switches, computers, utilities, and so on. To reduce the costs, call centers are frequently implemented in low-cost labor markets (LCLMs), which are typically found in developing countries. While the labor costs may be less than those associated with a domestic call center, other costs may be unpredictable due to, for example, government trade regulations, currency fluctuations, customer privacy and security issues, developing country instability, and so on. Additionally, there is frequently a tangible negative customer impact due to language and cultural barriers between the customer and a foreign customer support agent. Reducing the costs associated with establishing a call center may increase the ability to provide customer support via domestic customer support agents.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for support incident routing are described. The Internet is utilized to distribute the received customer support calls among a plurality of customer support agents who may be remotely located and geographically distributed. A customer support call is received via a communications network (e.g., as a standard telephone call). An integrated voice response system may be utilized to automatically gather from the user, data that indicates the nature of the call (e.g., identify a specific computer system or software application for which support is being requested). A customer support incident ticket is created based on the data gathered from the user, and the customer support incident ticket is assigned to a customer support agent. The customer support call is then relayed between a communication device (e.g., a telephone) associated with the calling customer, and a computer system being utilized by the customer support agent. If the customer communicates voice data (e.g., via a telephone), the voice data is converted to voice-over-IP (VOIP) data packets, which are then transmitted via the Internet to the agent's computer system. Similarly, VOIP data packets received over the Internet from the agent's computer system are converted to voice data and relayed to the customer's telephone via the communication network. Alternatively, the customer and the agent may communicate directly, VOIP to VOIP, provided that the customer has a device that supports VOIP communication.

DETAILED DESCRIPTION

The embodiments described below provide techniques for support incident routing. The Internet is utilized to distribute the received customer support calls among a plurality of customer support agents who may be remotely located and geographically distributed.

Figure 1:
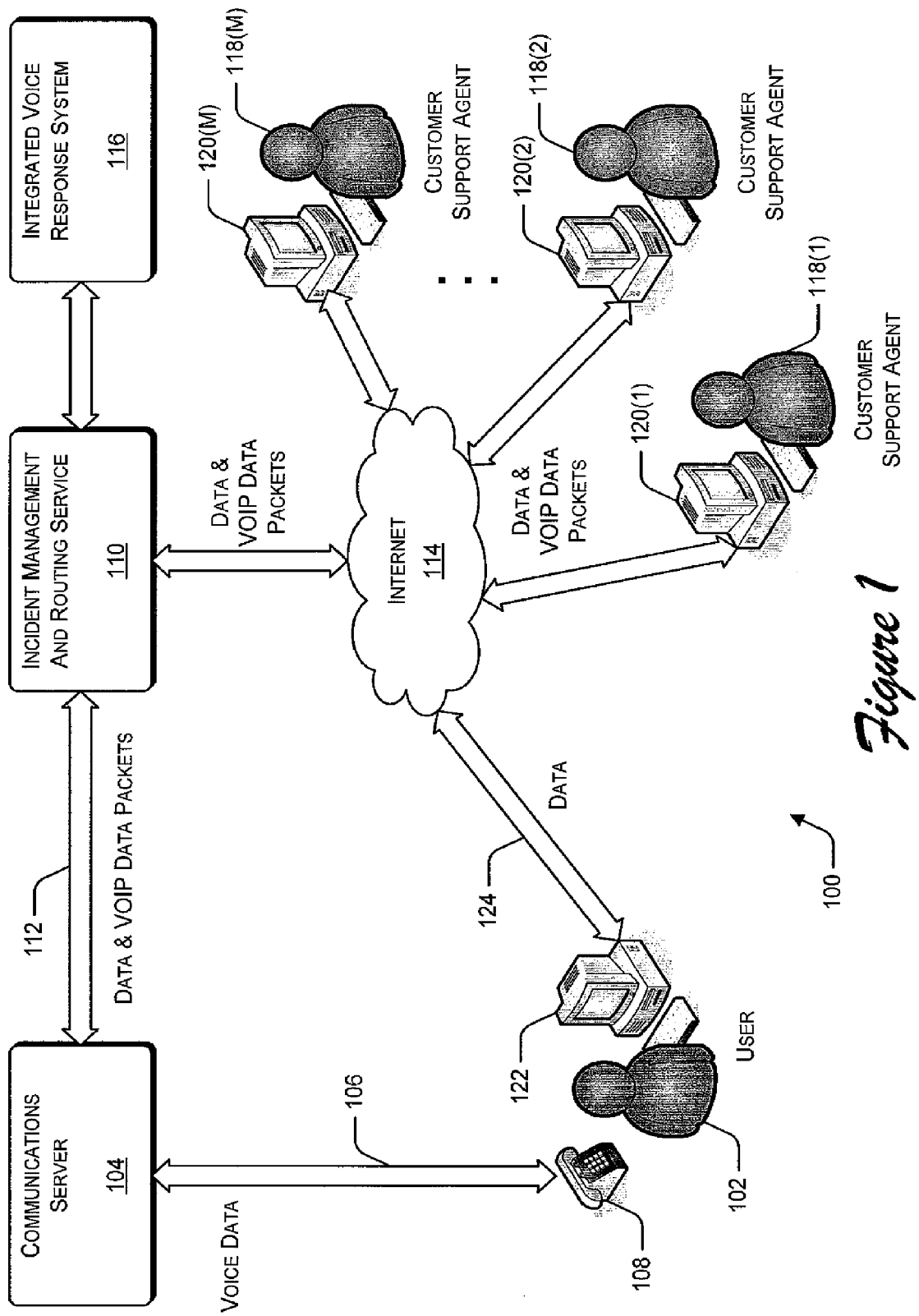
FIG. 1 is a pictorial diagram that illustrates an exemplary distributed customer support network configured to implement support incident routing.

FIG. 1 illustrates an exemplary distributed customer support network environment 100. It is to be appreciated and understood that this exemplary environment constitutes but one example of an environment in which the techniques described herein may be implemented. It is to be appreciated and understood that other environments can be utilized without departing from the spirit and scope of the claimed subject matter.

FIG. 1 illustrates exemplary customer support incident routing. User 102 contacts communications server 104 via a communication network 106. In an exemplary implementation, user 102 uses a communication device 108, such as a traditional telephone. Communication device 108 may be implemented as any type of device via which user 102 can communicate with communications server 104, such as, for example, a traditional telephone, a cell phone, or a computing device that supports voice-over-IP (VOIP). Communication network 106 typically represents a telephone network, but may also represent any other type of network via which a customer support call may be communicated.

Communications server 104 receives communication data from user 102, and forwards the data to incident management and routing service 110 via a data network 112. Data network 112 may be implemented, for example, as a direct connection between communications server 104 and incident management and routing service 110, as a local area network, or as a wide area network, such as the Internet 114. In an exemplary implementation, communications server 104 and incident management and routing service 110 are implemented as separate devices. In an alternate implementation, communications server 104 and incident management and routing service 110 may be implemented as separate software modules implemented on the same computing device, or as two parts of the same software module.

When a call is received from a customer, incident management and routing service 110 routes the call to integrated voice response (IVR) system 116. IVR system 116 is configured to interact with the user to gather data that can be used to determine the nature of the customer support call. For example, IVR system 116 may gather data that indicates the calling user's call-back number (e.g., in case the call is inadvertently dropped), preferred language, and the technical area(s) (e.g., type of product) for which support is being requested. Based on the data gathered from the user via IVR system 116, incident management and routing service 110 generates a customer support incident ticket associated with the customer support call.

Multiple customer support agents 118(1), 118(2), . . . , 118(M), each with their own personal computer (PC) system 120(1), 120(2), . . . , 120(M) may log on to incident management web serer 110 via the Internet 114, to provide support to customers. Any number or combination of customer support agents 118 may be logged on at any given time. Because the customer support agents 118 login to incident management and routing service 110 via the Internet 114, customer support agents 118 may be located anywhere in the world, provided they have access to an Internet connection. In an exemplary implementation, incident management and routing service 110 maintains, for each customer support agent 118, a profile that indicates, for example, the customer support agent's location, language, and technical area(s) of expertise. In an implementation, a pending customer support ticket is automatically assigned to a customer support agent based on a combination of the agent's availability, language, and area of expertise. In this way, an attempt is made to connect a customer with a customer support agent who speaks the same language as the customer and has expertise in the technical area with which the customer is seeking support.

Once a customer support ticket is assigned to a customer support agent 118, the customer support call is routed between the user's communication device 108 and the customer support agent's PC 120 via communications server 104, incident management and routing service 110, and the Internet 114. For example, communications server 104 receives voice communication from the user via communication network 106. The received voice data is converted to VOIP data packets, which are then transmitted via incident management and routing service 110 and the Internet 114 to the agent's PC 118. Similarly, voice communication from customer support agent 118 is sent as VOIP data packets from the customer support agent's PC 120 via the Internet 114 and incident management and routing service 110 to communications server 104. Communications server 104 converts the VOIP data packets to voice data that is then transmitted via communications network 106 to the user's communication device 108. As describe above, in an alternate implementation, the user's communication device 108 may support VOIP communication, in which case, the translation of the customer data from voice data to VOIP data packets and the translation of the customer support agent's VOIP data packets to voice data is not performed.

In an exemplary implementation, while handling a customer support icident, customer support agent 118 can request data from a computing device 122 associated with the user. Alternatively, the customer support agent 118 can request that the user 102 send data via the user's computing device 122. With an Internet connection 124, data is transmitted from the user's computing device 122 to incident management and routing service 110, which then relays the data via the Internet 114 to the customer support agent's PC 118. Various types of communication can be implemented to support the transmission of data between the user's computing device 122 and the customer support agent's PC 120. For example, data may be transmitted via VOIP data packets, email, instant messaging, and so on. Computing device 122 may be implemented, for example, as a personal computer, a laptop computer, a computer gaming system, and so on.

Figure 2:
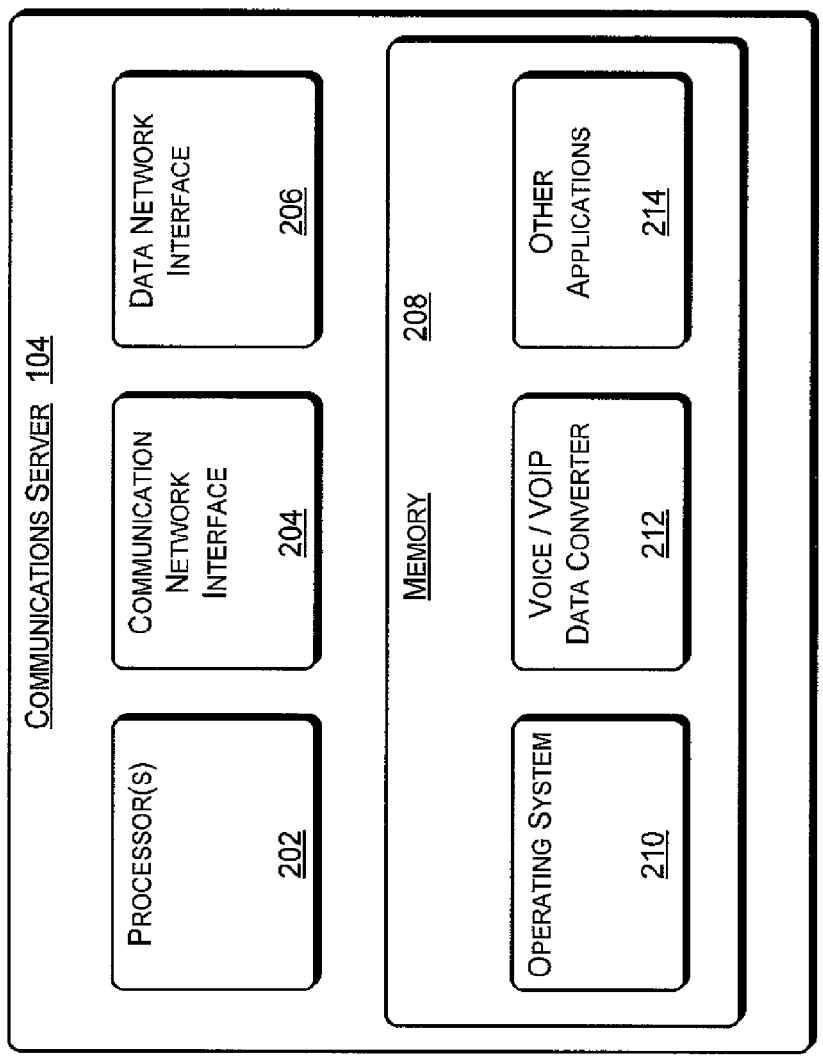
FIG. 2 is a block diagram that illustrates select components of an exemplary communications server implemented as part of the distributed customer support network shown in FIG. 1.

FIG. 2 illustrates select components of an exemplary communications server 104, as shown in FIG. 1. Communications server 104 includes one or more processors 202, communication network interface 204, data network interface 206, and memory 208. Communication network interface 204 enables communications server 104 to communicate with a user's communication device via communications network 106. Data network interface 206 enables communication server 104 to communicate with incident management and routing service 110 via data network 112.

Operating system 210, voice/voice-over-IP (VOIP) data converter 212, and other applications 214 are stored in memory 208 and executed by processor(s) 202. Voice/VOIP data converter 212 is configured to convert voice data received from the user 102 to VOIP data packets that can be transmitted via the Internet 114 to a customer support agent's PC 120. Voice/VOIP data converter 212 is further configured to convert VOIP data packets generated by customer support agent PC120 to voice data that can be transmitted via communication network 106 to the user's communication device 108. As described above, in a scenario in which the user's communication device 108 supports VOIP communication, voice/VOlP data converter 212 may be bypassed.

Figure 3:
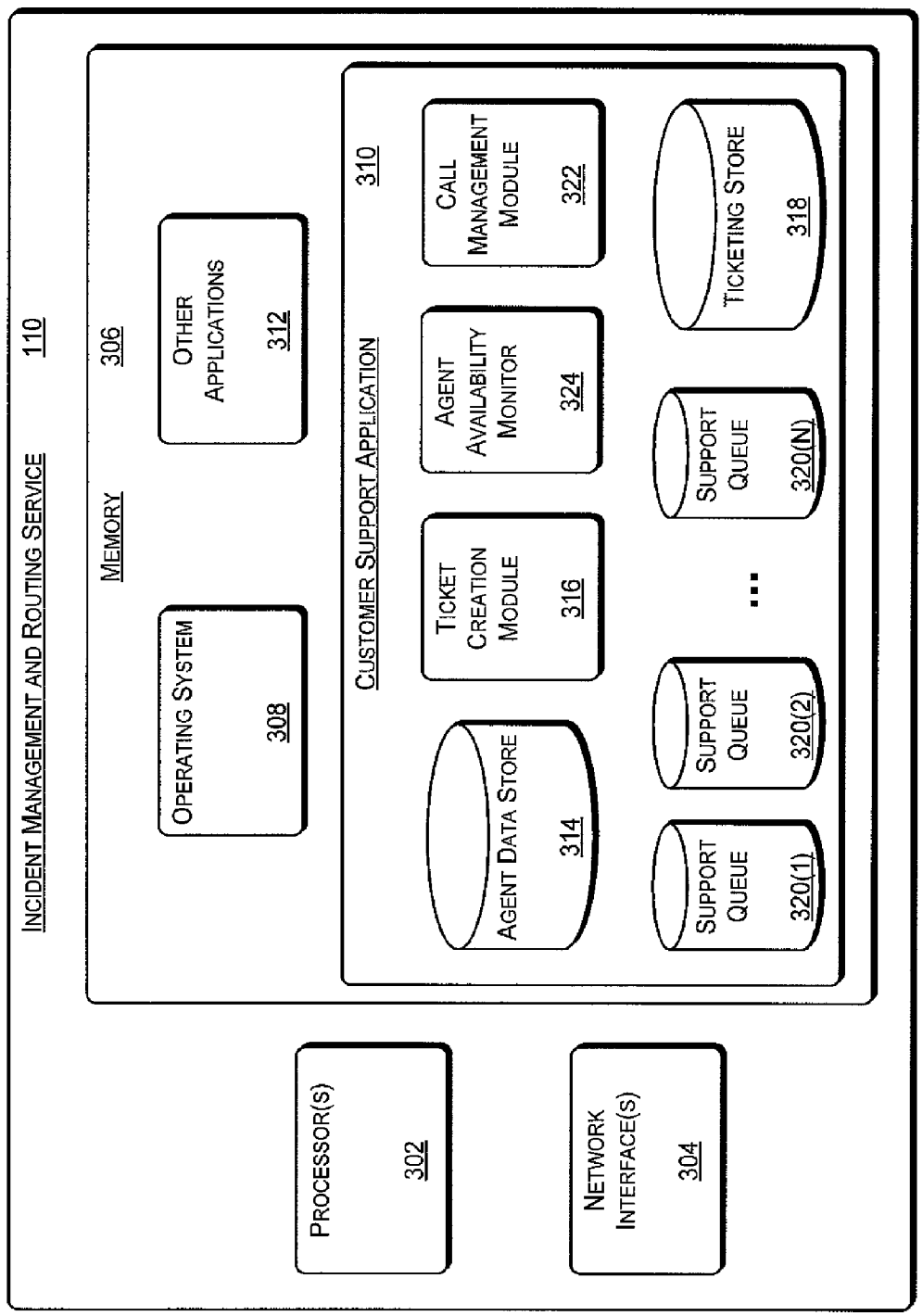
FIG. 3 is a block diagram that illustrates select components of an exemplary incident management and routing service implemented as part of the distributed customer support network shown in FIG. 1.

FIG. 3 illustrates select components of an exemplary incident management and routing service 110, as shown in FIG. 1. Incident management and routing service 110 includes one or more processors 302, network interface(s) 304, and memory 306. Network interface(s) 304 enable incident management and routing service 110 to communicate with communications server 104 via data network 112. Network interface(s) 304 also enable incident management and routing service 110 to communicate with other computing devices, such as integrated voice response system 116, customer support agent PCs 120 and user computing device 122, via the Internet 114.

Operating system 308, customer support application 310, and other applications 312 are stored in memory 306 and executed by processor(s) 302. Exemplary customer support application 310 includes agent data store 314, ticket creation module 316, ticketing store 318, support queues 320(1), 320(2), . . . , 320(N), call management module 322, and agent availability monitor 324. Agent data store 314 is configured to maintain profile data associated with customer service agents 118. Profile data may include, for example, an agent's location, an agent's language, an agent's technical areas of expertise, and so on.

Ticket creation module 316 is configured to receive data gathered from the user via a received customer support call (e.g., data gathered via IVR system 116), and generate a customer support incident ticket that describes the nature of the customer support call. The ticket generated by ticket creation module 316 is added to ticketing store 318.

Ticketing store 318 is configured to maintain data associated with customer support calls. Ticketing store 318 may be configured to maintain data that is gathered from the user by IVR system 116, data identifying one or more customer support agents who have been assigned to handle the customer support incident, additional data that may be requested by a customer support agent while handling the customer support incident, an indicator of a duration of time spent on the customer support incident by the customer support agent, log entries created by one or more customer support agent, VOIP data packets representing a recording of the customer support call associated with the customer support incident, and so on. In an exemplary implementation, customer support calls are recorded to support quality of service reviews.

Support queues 320 are configured to maintain representations of pending customer support incident tickets. In an exemplary implementation, each support queue 320 is associated with a particular technical area of expertise and/or a particular language. In an exemplary implementation, rather than copying the entire customer support incident ticket to a support queue, a representation of the ticket (e.g., a ticket ID) or a link to the ticket may be added to the appropriate queue. A customer support incident ticket is removed from the support queue 320 when it is assigned to a customer support agent 118. In an alternate implementation, customer support application 310 does not include support queues 320. Rather, customer support incident tickets are assigned directly to an available customer support agent.

Call management module 322 is configured to manage and monitor assignments of customer support agents to customer support incident tickets. Call management module 322 is further configured to coordinate data transmissions in support of communication between user 102 and a customer support agent 118 to resolve a particular customer support incident ticket. Call management module 322 includes routing rules that are used to determine how customer support incident tickets are routed (e.g., which queues the tickets are added to, or in an alternate implementation that does not include queues, which customer service agents the tickets are routed to). In an exemplary implementation, the routing rules maintained by call management module 322 are configurable by an administrator of the incident management and routing service 110.

Agent availability monitor 324 is configured to monitor agents as the log into and out of customer support application 310. Agent availability monitor 324 is further configured to monitor which agents are currently available and which agents are currently assigned to a customer support incident ticket, and are therefore unavailable.

Figure 4:
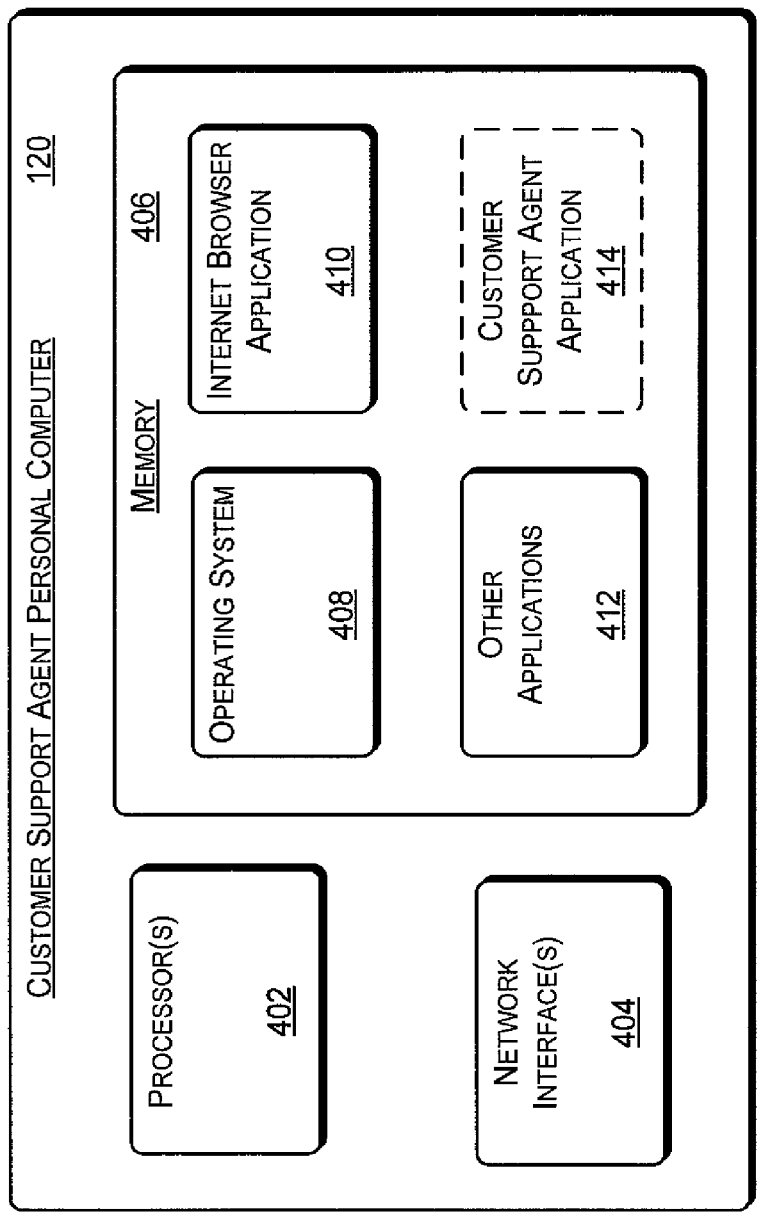
FIG. 4 is a block diagram that illustrates select components of an exemplary customer support agent personal computer to which support incidents may be routed.

FIG. 4 illustrates select components of an exemplary customer service agent personal computer 120, as shown in FIG. 1. Personal computer 120 includes one or more processors 402, network interface(s) 404, and memory 406. Network interface 404 enables personal computer 120 to communicate with other computing devices (e.g., incident management and routing service 110) via the Internet 114.

Operating system 408, Internet browser application 410, and other applications 412 are stored in memory 406 and executed by processor 402. Internet browser application 410 provides a user interface via which web sites and/or web-based applications may be viewed.

In an exemplary implementation, customer support agent 118 provides customer support via a web-based application (e.g., customer support application 310) that is served from incident management and routing service 110 and accessed via Internet browser application 410. In an alternate implementation, customer support agent application 414 is stored in memory 406 and executed by processor 402. In such an application, customer support agent application 414 is stored locally on the customer support agent's personal computer 120, and provides an interface to customer support application 310. In another alternate implementation, customer support application 310 is not a web-based application, but may be implemented as a network-based application accessible via a network other than the Internet.

Methods for implementing support incident routing may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through one or more communications networks. In a distributed computing environment, computer executable instructions may be located in both local and remote computer storage media, including memory storage devices.

FIGS. 5-11 illustrate exemplary methods for support incident routing. FIGS. 5-11 are specific examples of support incident routing, and are not to be construed as limitations. The order in which the method blocks are described is not intended to be construed as a limitation, and any number of the described method blocks can be combined in any order to implement the methods. Furthermore, the methods can be implemented in any suitable hardware, software, firmware, or combination thereof.

Figure 5:
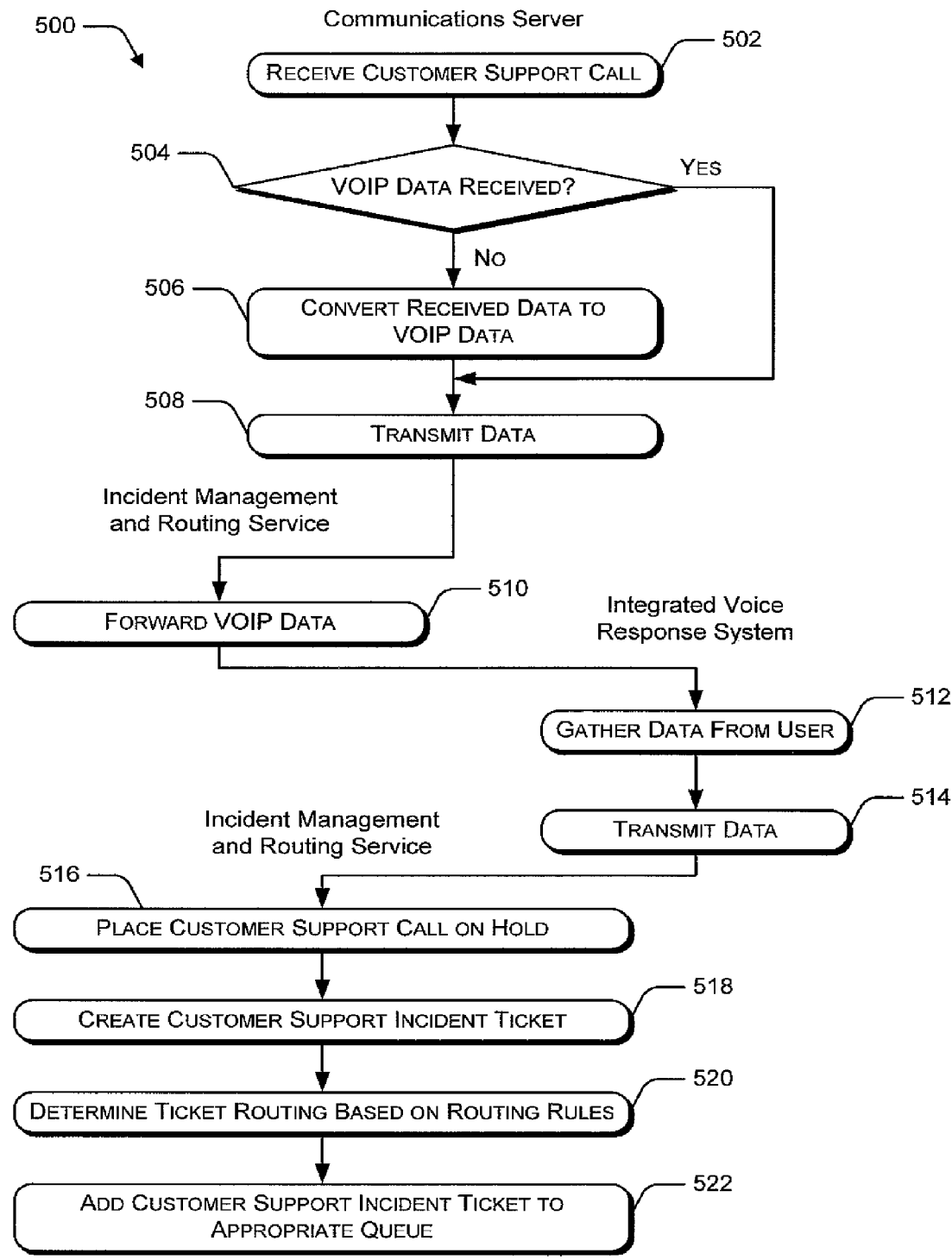
FIG. 5 is a flow diagram that illustrates an exemplary method for creating a customer support incident ticket.

FIG. 5 illustrates an exemplary method 500 for creating a customer support incident ticket. At block 502, a customer support call is received. For example, communications server 104 receives a telephone call from user 102 via communications network 106.

At block 504, a determination is made as to whether or not the data being received via the customer support call is in the form of VOIP data packets. For example, communications server 104 determines the format of the received data.

If it is determined that the received data is in the form of VOIP data packets (the "Yes" branch from block 504), then processing continues as described below with reference to block 508. If it is determined that the received data is not in the form of VOIP data packets (the "No" branch from block 504), then at block 506, the received data is converted to VOIP data packets. For example, voice/VOTP data converter 212 converts received voice data to VOIP data packets.

At block 508, the VOIP data is transmitted to an incident management and routing service. For. example, communications server 104 transmits VOIP data packets over data network 112 to incident management and routing service 110.

At block 510, VOIP data is forwarded from the incident management and routing service to an integrated voice response system. For example, incident management and routing service 110 forwards VOIP data packets received from communications server 104 to integrated voice response system 116.

At block 512, data is gathered from the customer. For example, integrated voice response (IVR) system 116 communicates with user 102 to gather data indicating the nature of the customer support call. The gathered data may include, for example, the user's location, the user's preferred language, an indication of a type of computing device for which the user is seeking support, an indication of a particular software application for which the user is seeking support, and so on.

At block 514, data is transmitted to the incident management and routing service. For example, integrated voice response system 116 transmits the data gathered from the user to incident management and routing service 110.

At block 516, the customer support call is put on hold. For example, call management module 322 activates a hold status in association with the customer support call. In an exemplary implementation, a call ID is associated with the call, and with the data that is gathered from the user so that the call can later be retrieved by a customer support agent based on the gathered data.

In an alternate implementation, the customer may opt to have a customer support agent call back, rather than waiting on hold. In such an implementation, after the data is gathered from the customer, the call is disconnected, rather than being placed on hold.

At block 518, a customer support incident ticket is created. For example, ticket creation module 316 formats the data that was gathered from the customer, and adds the data to ticketing store 318.

At block 520, ticket routing is determined based on routing rules. For example, call management module 322 determines how the customer support incident ticket is to be routed based on routing rules maintained by call management module 322. As described above with reference to FIG. 3, in an exemplary implementation, the routing rules maintained by call management module 322 may be modified by an administrator of incident management and routing service 110. In an exemplary implementation, the routing rules are used to determine a support queue to which the ticket is to be added based on a technical area (e.g., the product for which support is being requested). Furthermore, selection of the support queue may further be based on the customer's location and/or preferred language. For example, there may be multiple queues for the same technical area, but each for a different preferred language. As described above, in an alternate implementation, rather than routing customer support incident tickets to support queues, the tickets are routed directly to available customer support agents.

At block 522, the customer support incident ticket is added to an appropriate support queue. For example, call management module 322 directs ticket creation module 316 to add the customer support incident ticket to a particular support queue 320. In an exemplary implementation, the data that is added to the support queue provides a link by which a customer support agent can access the customer support incident ticket stored in ticketing store 318. In an alternate implementation, rather than adding the customer support incident ticket to a support queue, the customer support incident ticket is sent directly to an available customer support agent.

Figure 6:
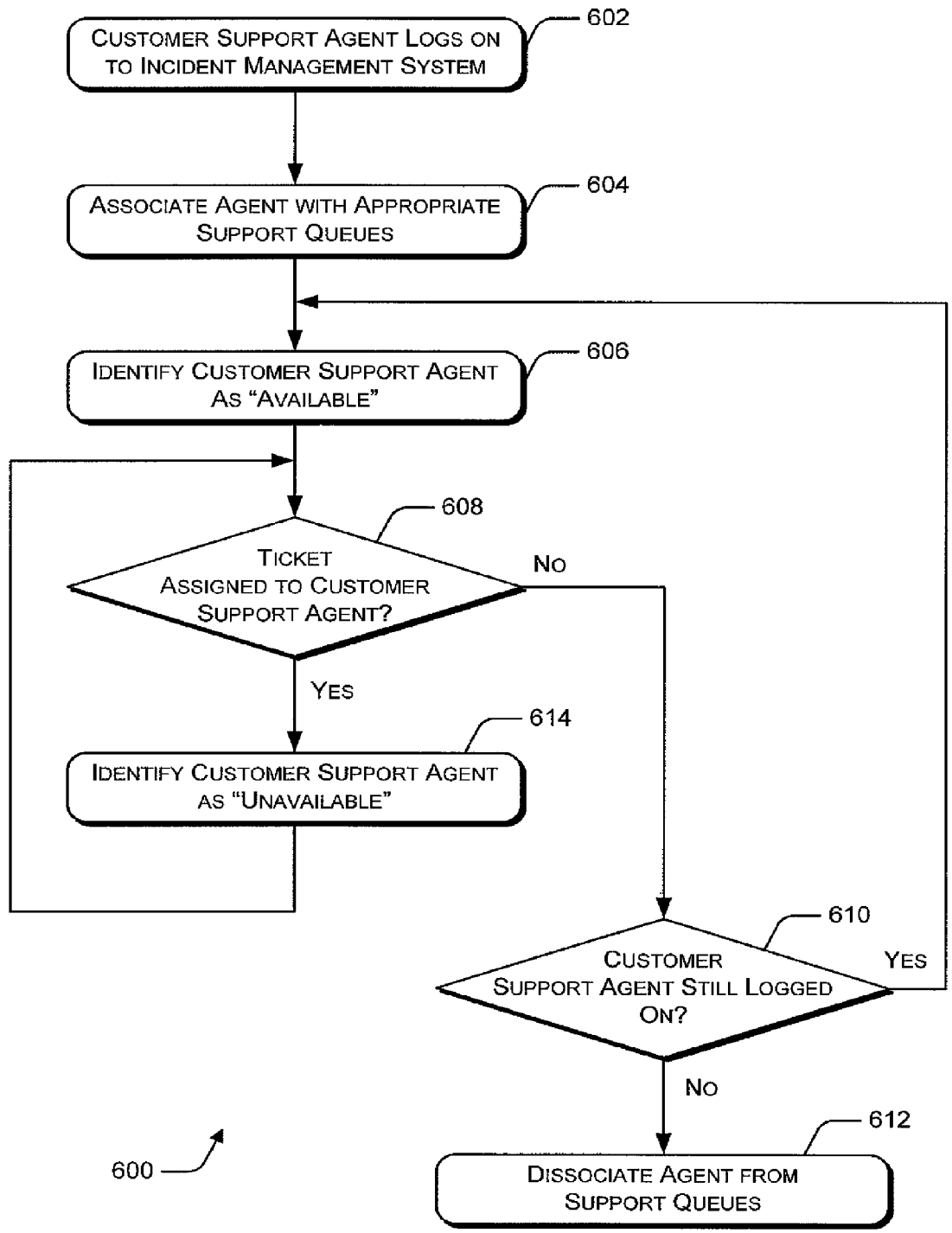
FIG. 6 is a flow diagram that illustrates an exemplary method for monitoring customer support agent availability.

FIG. 6 illustrates an exemplary method 600 for monitoring customer support agent availability. At block 602, a customer support agent logs on to an incident management system. For example, a customer support agent 118 may launch customer support agent application 414, which establishes a connection, via the Internet 114, with incident management and routing service 110. Alternatively, customer support agent 118 may establish an Internet connection, via Internet browser application 410, with incident management and routing service 110 by accessing a particular web site associate with customer support application 310.

At block 604, the customer support agent is associated with one or more support queues. For example, customer support application 310 automatically maps the customer support agent 118 to one or more support queues 320 based, for example, on technical areas of expertise identified in the customer support agent's profile, which is maintained in agent data store 314. In an exemplary implementation, a customer support agent's profile is created by a manager when the customer support agent is hired. In an alternate implementation, customer support application 310 may provide an interface through which a customer support agent 118 can create and/or update their profile. In yet another implementation, a customer support agent profile may be generated automatically by mining data, for example, from previous tickets that the customer support agent has worked or from data and documents scanned on the customer support agent's computer hard drive.

At block 606, the customer support agent is identified as being available. For example, agent availability monitor 324 may set a flag associated with the customer support agent's profile in agent data store 314 to indicate the agent's current availability.

At block 608, a determination is made as to whether or not a customer support incident ticket is currently assigned to the customer support agent. If no customer support incident ticket is currently assigned to the customer support agent (the "No" branch from block 608), then at block 610, a determination is made as to whether or not the customer support agent is still logged on to the incident management system.

If it is determined that the customer support agent is still logged on to the incident management system (the "Yes" branch from block 610), processing continues as described above with reference to block 606. On the other hand, if it is determined that the customer support agent is no longer logged on to the incident management system (the "No" branch from block 610), then at block 612, the customer support agent is dissociated from the support queues.

If, it is determined that a customer support incident ticket is assigned to the customer support agent (the "Yes" branch from block 608), then at block 614, the customer support agent is identified as unavailable. For example, agent availability monitor 324 may set a flag associated with the customer support agent's profile in agent data store 314 to indicate the agent's current unavailability.

Figure 7:
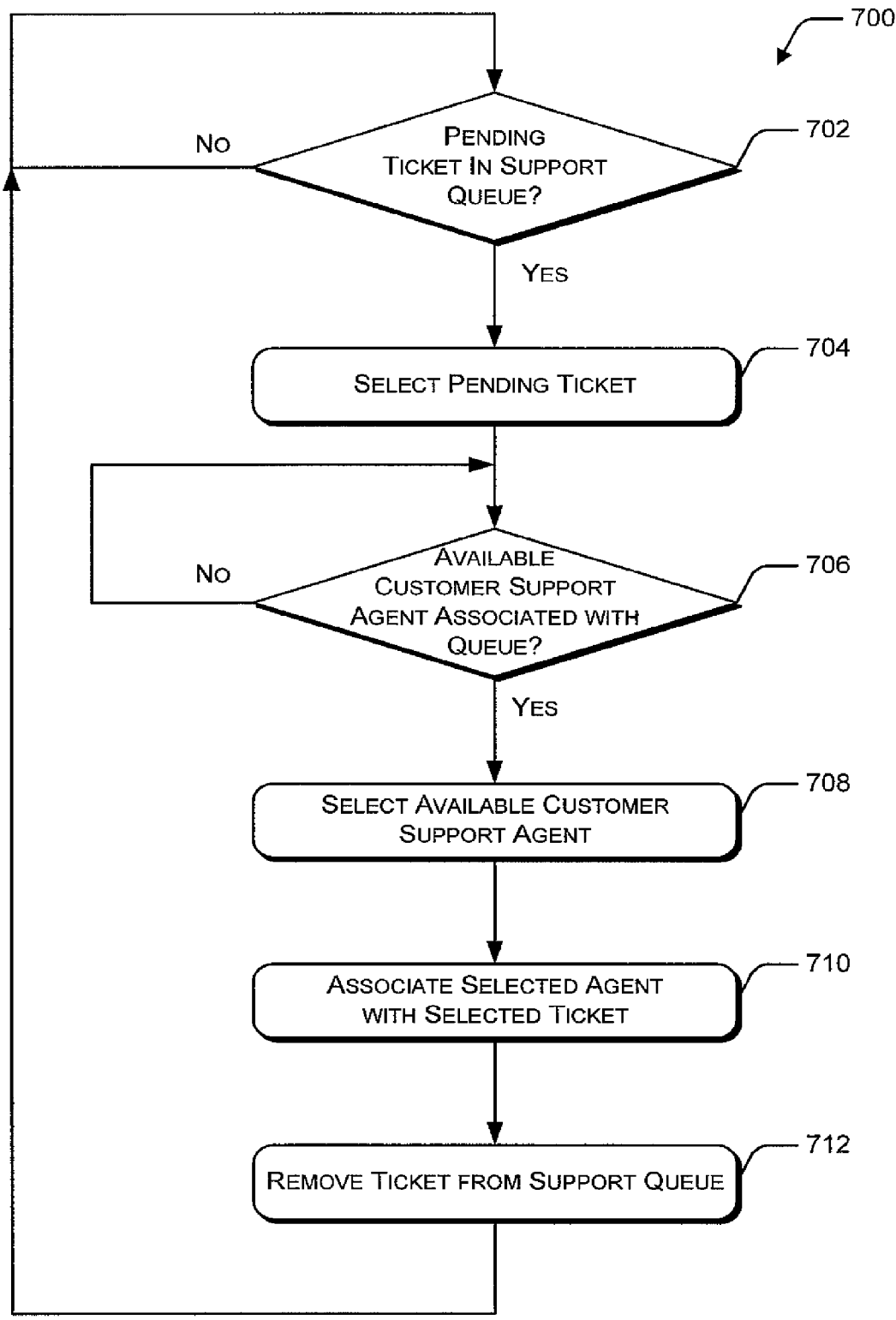
FIG. 7 is a flow diagram that illustrates an exemplary method for assigning a customer support incident ticket to a customer support agent according to a push model.

FIG. 7 illustrates an exemplary method 700 for assigning a customer support incident ticket to a customer support agent according to a push model. At block 702, a determination is made as to whether or not any customer support incident tickets are pending in a particular support queue. For example, call management module 322 queries a support queue 320 for any pending customer support incident tickets. In an exemplary implementation, method 700 is performed in association with each support queue 320.

If the support queue 320 does not contain any pending customer support incident tickets (the "No" branch from block 702), then processing continues as described above with reference to block 702. On the other hand, if the support queue 320 contains one or more pending customer support incident tickets (the "Yes" branch from block 702), then at block 704, a pending customer support incident ticket is selected from the support queue. For example, call management module 322 selects the customer support incident ticket that has been pending in the support queue for the longest period of time.

At block 706, a determination is made as to whether or not there is an available customer support agent associated with the support queue. For example, call management module 322 may query agent data store 314 to identify a customer support agent who is associated with the support queue 320 and is identified as being available. If no customer support agents associated with the support queue are available (the "No" branch from block 706), then processing continues at block 706. If one or more customer support agents associated with the support queue are available (the "Yes" branch from block 706), then at block 708, an available customer support agent is selected. For example, call management module 322 may select from the available agents, the one agent whose status has been set to "available" for the longest period of time.

At block 710, the selected customer support agent is associated with the selected customer support incident ticket. For example, call management module 322 may update data in ticketing store 318 to indicate that the selected customer support agent is currently handling the selected customer support incident ticket.

At block 712, the selected ticket is removed from the support queue. For example, call management module 322 removes the data identifying the selected customer support incident ticket from the support queue. Processing of the support queue continues as described above with reference to block 702.

As described above, an alternate implementation may not include support queues. In such an implementation, tickets are associated with customer support agents directly, based on the customer support agent profiles.

Figure 8:
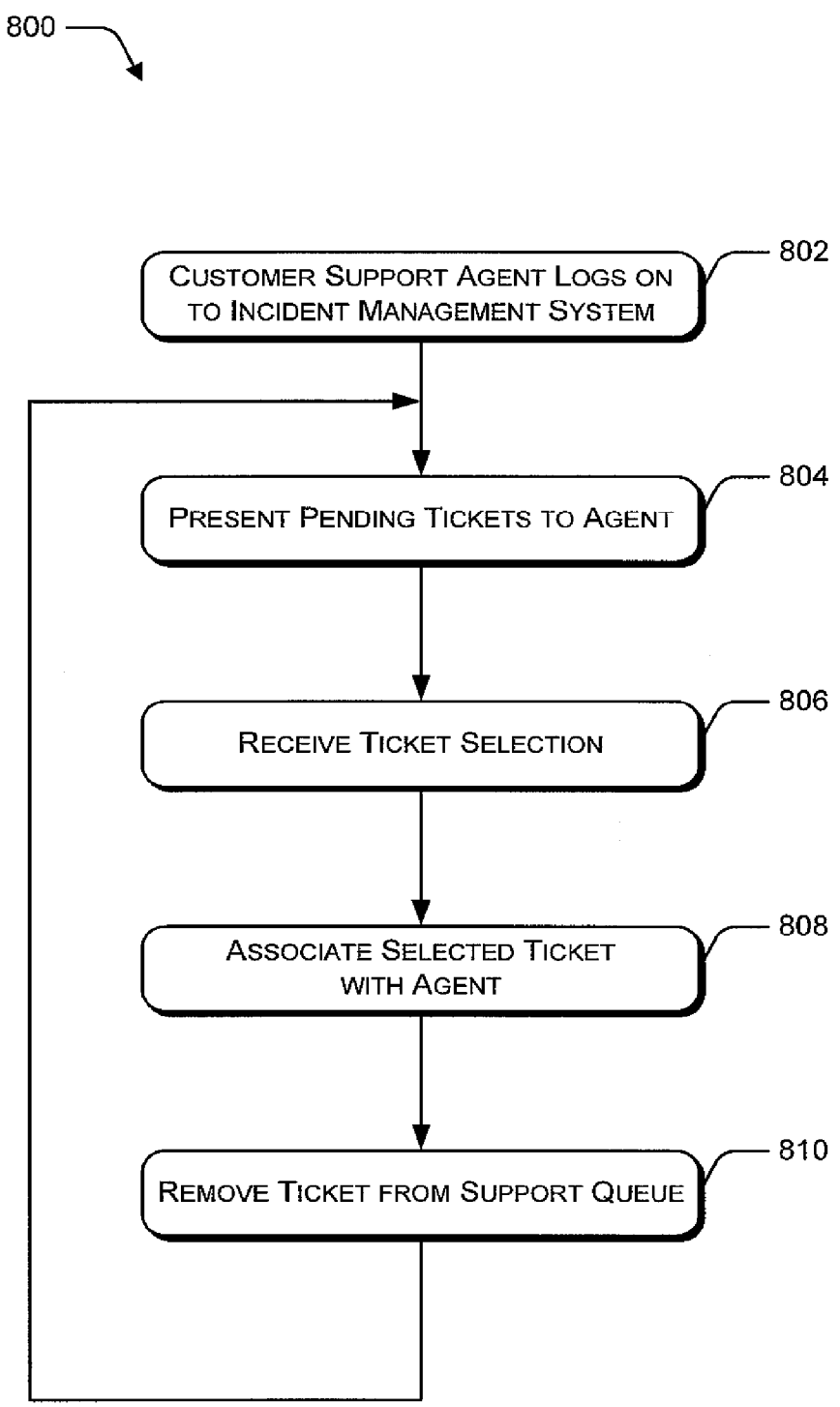
FIG. 8 is a flow diagram that illustrates an exemplary method for assigning a customer support incident ticket to a customer support agent according to a pull model.

FIG. 8 illustrates an exemplary method 800 for assigning a customer support incident ticket to a customer support agent according to a pull model. At block 802, a customer support agent logs on to an incident management and routing service. For example, a customer support agent 118 may launch customer support agent application 414, which establishes a connection, via the Internet, with incident management and routing service 110. Alternatively, customer support agent 118 may establish an Internet connection, via Internet browser application 410, with incident management and routing service 110 by accessing a particular web site associated with customer support application 310. As described above, with reference to FIG. 6, when a customer support agent logs on, the agent is automatically associated with one or more support queues.

At block 804, pending customer support incident tickets are presented to the customer support agent. For example, customer support application 310 transmits a representation of pending customer support incident tickets to the customer support agent's computer 120 via the Internet 114. In an exemplary implementation, the data is presented via a user interface associated with customer support agent application 414. Alternatively, the data may be presented via a web site presented to the user via Internet browser application 410. If the customer support agent 118 is associated with multiple support queues 320, the customer support incident tickets may be presented in a grouped fashion to indicate which of the pending tickets are associated with each of the multiple support queues to which the customer support agent is mapped.

At block 806, a ticket selection is received. For example, call management module 322 receives via the Internet, an indication that the customer support agent has selected one of the pending customer support incident tickets.

At block 808, the selected ticket is associated with the customer support agent. For example, call management module 322 may update data in ticketing store 318 to indicate that the selected customer support agent is currently handling the selected customer support incident ticket.

At block 810, the ticket is removed from the support queue. For example, call management module 322 removes the data identifying the selected customer support incident ticket from the support queue. Processing then continues as described above with reference to block 804.

As described above, FIG. 7 illustrates a push model for assigning customer support agents to customer support incident tickets while FIG. 8 illustrates a pull model for assigning customer support agents to customer support incident tickets. In an exemplary implementation, a combination of models may be implemented, for example, to ensure that pending customer support incident tickets don't remain in a queue indefinitely. For example, a pull model may be implemented by default, but when a customer support incident ticket has been pending for a pre-defined period of time, the system may automatically convert to a push model to force the assignment of any long-pending tickets to support agents.

Figure 9:
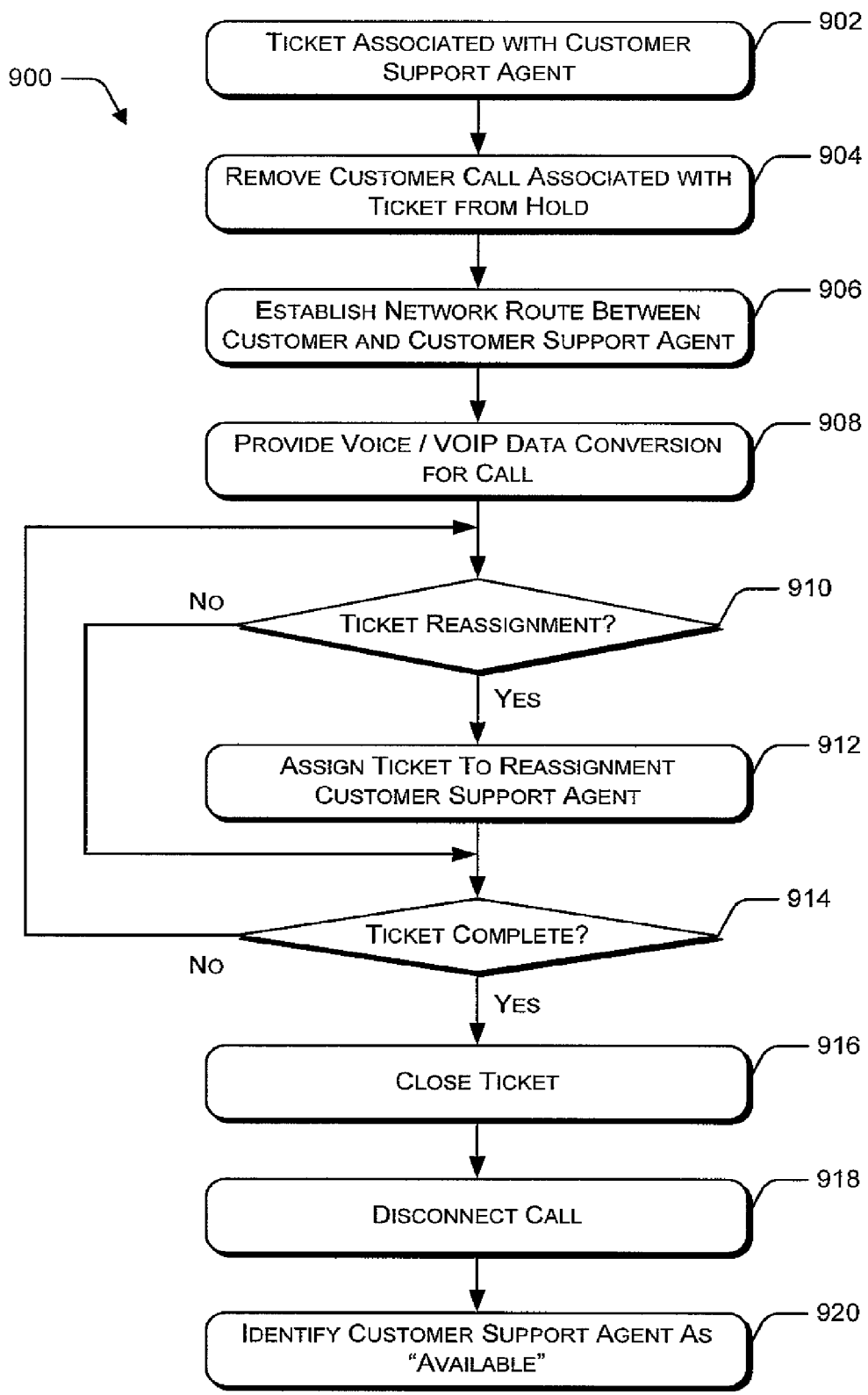
FIG. 9 is a flow diagram that illustrates an exemplary method for enabling a customer support call.

FIG. 9 illustrates an exemplary method 900 for enabling a customer support call. At block 902, a customer support incident ticket is associated with a customer support agent. For example, a customer support incident ticket may be associated with a customer support agent as described above with reference to block 710 shown in FIG. 7, or block 808 shown in FIG. 8.

As described above with reference to FIG. 5, the customer telephone call is placed on hold while the customer support incident ticket is created and until a customer support agent is assigned to the customer support incident ticket. At block 904, the customer telephone call associated with the customer support incident ticket is removed from hold. For example, communications server 104 re-establishes a connection with (i.e., removes from hold) the customer call.

In an alternate implementation, also discussed above with reference to FIG. 5, the customer may have requested a call back, rather than waiting on hold. In such an implementation, when a customer support agent is assigned the customer support incident ticket, a call to the user is automatically initiated.

At block 906, a network call route is established between the customer and the customer support agent. For example, a communication session is established between the user's communication device 108 and communications server 104; between communications server 104 and incident management and routing service 110; and between incident management and routing service 110 and the customer support agent's PC 120. As described above with reference to FIG. 1, communications server 104 and incident management and routing service 110 may be implemented as separate devices, as separate software modules on the same device, or as two parts of the same software module.

Furthermore, as described above with reference to FIG. 1, in an exemplary implementation, a network connection 124 may be established that enables various forms of data (e.g., email, instant messaging, and so on) to be communicated to the customer support agent from the user.

At block 908, voice/VOIP data conversion is provided for the call. For example, voice/VOIP data converter 212 receives voice data from the customer's telephone 108, converts the voice data to VOIP data packets, and transmits the VOIP data packets to incident management and routing service 110. Incident management and routing service 110 forwards the VOIP data packets to the customer support agent's computer 120 via the Internet 114. Similarly, incident management and routing service 110 receives VOIP data packets from the customer support agent's computer 120, and forwards the VOIP data packets to communications server 104. Voice/VOIP data converter 212 converts the VOIP data packets into voice data, which is then transmitted from cormnunications server 104 to the customer's telephone 108.

At block 910 a determination is made as to whether or not the customer support incident ticket is being reassigned. For example, a customer support agent may be unable to resolve an incident, and so, may reassign the ticket to another customer support agent. In an exemplary implementation, in such a scenario, a ticket reassignment indicator is transmitted from the agent's computer 120 to call management module 322.

If no indication of a ticket reassignment is detected (the "No" branch from block 910), then processing continues as described below with reference to block 914. On the other hand, if a ticket reassignment is detected (the "Yes" branch from block 910), then at block 912, the customer support incident ticket is reassigned to another customer support agent. In an exemplary implementation, the customer support incident ticket to be reassigned is added back into a support queue to be picked up by or assigned to another customer support agent. In an alternate implementation, the customer support agent currently assigned to the customer support incident ticket may indicate a specific customer support agent to whom the ticket is to be reassigned.

At block 914, a determination is made as to whether or not the customer support incident ticket has been completed. For example, a customer support agent may indicate through customer support agent application 414 that the customer support incident ticket has been completed. If it is determined that the customer support incident ticket has not been completed (the "No" branch from block 914), then processing continues as described above with reference to block 910.

If it is determined that the customer support incident ticket has been completed (the "Yes" branch from block 914), then at block 916, the ticket is closed. For example, call management module 322 adds a closed indicator to the customer support incident ticket data stored in ticketing store 318.

At block 918, the customer call is disconnected. For example, the telephone call between the customer's telephone 108 and communications server 104 is disconnected and the session between communications server 104 and incident management and routing service 110 associated with the customer support incident ticket is terminated.

At block 920, the customer support agent is identified as available. For example, agent availability monitor 324 may set a flag associated with the customer support agent's profile in agent data store 314 to indicate the agent's current availability.

Figure 10:
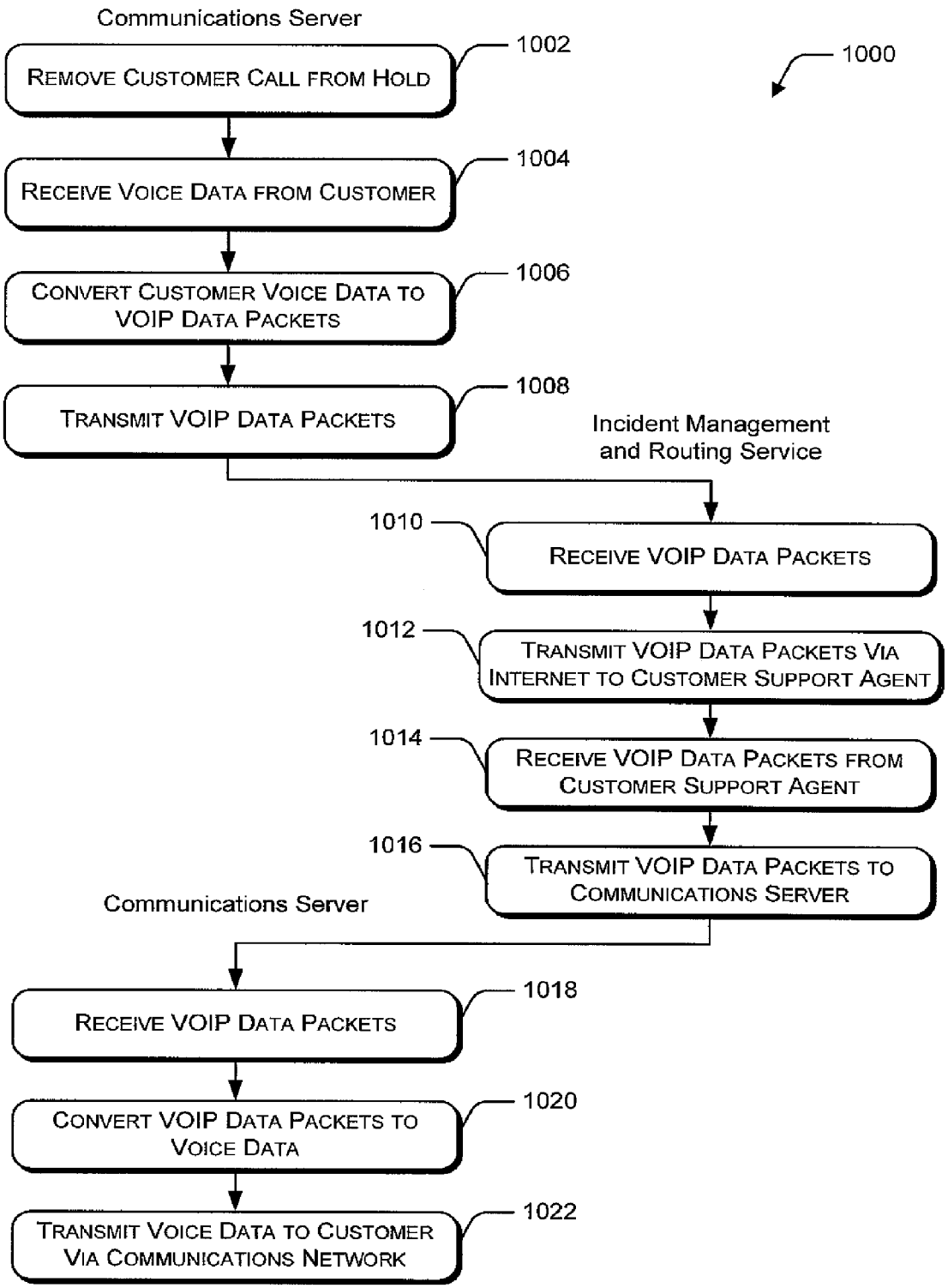
FIG. 10 is a flow diagram that illustrates an exemplary method for providing voice data transmission to enable a customer support call.

FIG. 10 illustrates an exemplary method 1000 for providing voice data transmission to enable a customer support call. At block 1002, a customer call is removed from hold. For example, communications server 104 re-establishes a connection with the customer call.

At block 1004, voice data is received from the customer. For example, communications server 104 receives voice data from the customer's telephone 108 via communications network 106.

At block 1006, the customer voice data is converted to VOIP data packets. For example, voice/VOIP data converter 212 converts the received voice data into VOIP data packets.

At block 1008, the VOIP data packets are transmitted. For example, communications server 104 transmits the converted VOIP data packets to incident management and routing service 110 over data network 112.

At block 1010, the web server receives the VOIP data packets. For example, incident management and routing service 110 receives the VOIP data packets that were transmitted over data network 112.

At block 1012, the VOIP data packets are transmitted via the Internet to a customer support agent. For example, call management module 322 transmits the received VOIP data packets to the customer support agent's PC 120 via the Internet 114.

At block 1014, VOIP data packets are received from the customer support agent. For example, customer support agent 118 speaks into a microphone associated with PC 120. The customer support agent's voice is transmitted as VOIP data packets from PC 120 via the Internet 114 to incident management and routing service 110.

At block 1016, the VOIP data packets are transmitted to the communications server. For example, incident management and routing service 110 transmits the VOIP data packets that were received from the customer support agent's PC 120 to communications server 104 via data network 112.

At block 1018, the communications server receives the VOIP data packets. For example, communications server 104 receives the customer support agent's VOIP data packets from incident management and routing service 110 via data network 112.

At block 1020, the VOIP data packets are converted to voice data. For example, voice/VOIP data converter 212 converts the received VOIP data packets to voice data.

At block 1022, the voice data is transmitted to the customer via a communications network. For example, communications server 104 transmits the voice data that was converted from the received VOIP data packets to the customer's telephone 108 via communication network 106.

Figure 11:
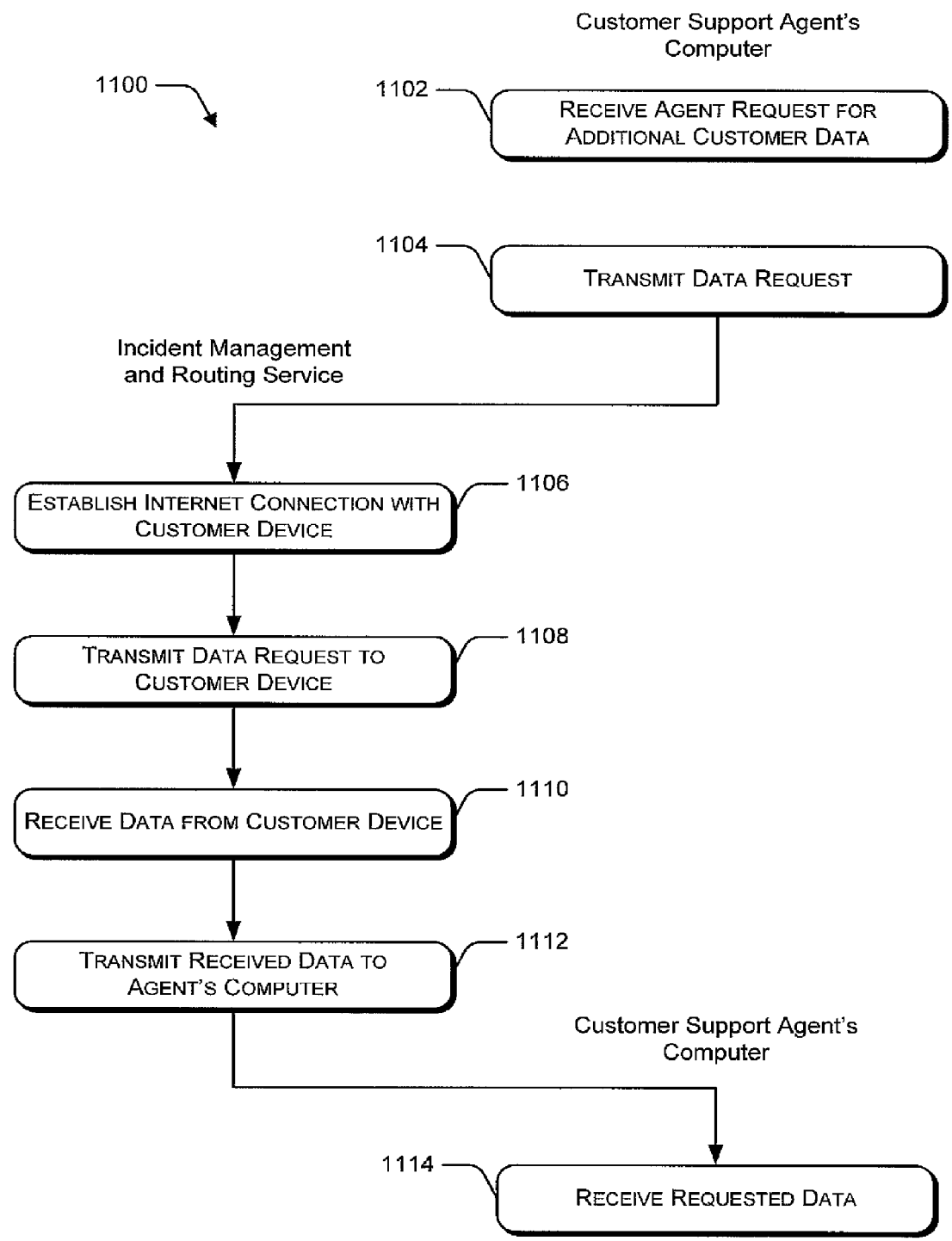
FIG. 11 is a flow diagram that illustrates an exemplary method for providing data transmission in association with a customer support call.

FIG. 11 illustrates an exemplary method 1100 for providing data transmission in association with a customer support call. At block 1102, an agent request for additional customer data is received. For example, customer support agent 118 may interact with customer support agent application 414 to indicate a request for data from the customer's computing device 122. Requested data may include, for example, application settings, error codes, error logs, and so on.

At block 1104, the data request is transmitted. For example, customer support agent application 414 transmits the data request via the Internet 114 to incident management and routing service 110.

At block 1106, an Internet connection is established with the customer's computing device. For example, incident management server 110 establishes a session 124 via the Internet 114 with the user's computing device 122.

At block 1108, a data request is transmitted to the customer's device. For example, incident management and routing service 110 transmits a data request to the customer's computing device 122 via Internet session 124.

At block 1110, the requested data is received from the customer's device. For example, the requested data is transmitted from the customer's computing device 122 to incident management and routing service 110 via Internet session 124.

At block 1112, the requested customer data is transmitted to the customer support agent's computer. For example, incident management web service 110 transmits the data received from the customer's computing device 122 to the customer support agent's PC 120 via the Internet 114.

At block 1114, the requested data is received by the customer support agent's computer. For example, the requested data is transmitted from incident management and routing service 110 to the customer support agent's PC 120 via the Internet 114.

Although embodiments of support incident routing have been described in language specific to structural features and/or methods, it is to be understood that the subject of the appended claims is not necessarily limited to the specific features or methods described. Rather, the specific features and methods are disclosed as exemplary implementations of support incident routing.

The invention claimed is:

1. A system comprising:
a communications server configured to:
  receive, via a communication network, voice data from a communication device associated with a customer, wherein the voice data indicates a nature of a customer support call; and
  convert the voice data to voice-over-IP (VOIP) data packets; and
an incident management and routing service configured to:
  receive, via a data network, the voice-over-IP data packets from the communications server;
  generate a customer support incident ticket based at least in part on the received voice-over-IP data packets;
  identify a customer support agent from among a plurality of customer support agents that are geographically distributed at facilities separate from a facility that includes the incident management and routing service;
  associate the customer support incident ticket with the customer support agent, wherein the customer support agent is located geographically distributed from the facility that includes the incident management and routing service and interacts with the incident management and routing service via an Internet connection;
  receive, via the data network, and during the customer support call between the communication device associated with the customer and a computing system associated with the customer support agent a request from the computing system associated with the customer support agent for data from a computing device associated with the customer, wherein the computing device associated with the customer is different than the communication device associated with the customer;
  send, via the data network, the request for the data to the computing device associated with the customer, wherein the requested data is not voice data;
  receive, via the data network, the requested data transmitted from the computing device associated with the customer; and
  send, via the data network the requested data to the computing system associated with the customer support agent.

2. The system as recited in claim 1, wherein the communications server comprises:
a processor;
a memory; and
a voice-to-VOIP data converter stored in the memory and executed on the processor, the voice-to-VOIP data converter configured to convert the voice data to the VOIP data packets.

3. The system as recited in claim 2, wherein the voice-to-VOIP data converter is further configured to convert VOIP data packets received from the incident management and routing service to voice data to be transmitted to the communication device associated with the customer.

4. The system as recited in claim 1, wherein the incident management and routing service comprises:

a processor;
a memory; and
a customer support application stored in the memory and executed on the processor, the customer support application comprising:
  a ticket creation module configured to generate the customer support incident ticket;
  a ticketing store configured to maintain data associated with the customer support incident ticket;
  a support queue configured to identify pending customer support incident tickets;
  an agent data store configured to maintain a profile associated with the customer support agent, the profile identifying a technical area of expertise associated with the customer support agent;
  an agent availability monitor configured to monitor availability of the customer support agent based at least in part on whether or not the customer support agent is logged on to the customer support application; and
  a call management module configured to:
    maintain routing rules;
    automatically route the customer support incident ticket to the customer support agent based at least in part on the routing rules; and
    manage assignment of the customer support agent to the customer support incident ticket.

5. The system as recited in claim 4, wherein the support queue is associated with a technical area of expertise.

6. The system as recited in claim 4, wherein the agent availability monitor is further configured to monitor the availability of the customer support agent based at least in part on the customer support agent being assigned to the customer support incident ticket.

7. The system as recited in claim 4, wherein the call management module is further configured to coordinate data transmissions in support of the customer support call between the communication device associated with the customer and the computing system associated with the customer support agent in association with the customer support incident ticket.

8. The system as recited in claim 4, wherein:
the profile associated with the customer support agent further identifies a language spoken by the customer support agent; and
the associating of the customer support incident ticket with the customer support agent is based, at least in part, on a comparison of the language spoken by the customer support agent and a preferred language associated with the customer support incident ticket.

9. The system as recited in claim 1, further comprising an integrated voice response system configured to automatically gather data from the customer.

10. A method comprising:
receiving, by an incident management and routing service, call data from a communication device associated with a customer via a communication network, the data indicating the nature of a customer support call, wherein the call data includes voice-over-IP (VOIP) data packets;
creating a customer support incident ticket based at least in part on the call data;
identifying a customer support agent from among a plurality of customer support agents that are geographically distributed at facilities separate from a facility that includes the incident management and routing service;

associating the customer support incident ticket with the customer support agent, the customer support agent being located geographically distributed from the facility that includes the incident management and routing service; and facilitating the customer support call between a customer support agent computing system associated with the customer support agent and the communication device associated with the customer by:

receiving via a data network, agent voice-over-IP (VOIP) data packets from the customer support agent computer system associated with the customer support agent;

converting the agent VOIP data packets into agent voice data;

transmitting the agent voice data to the communication device associated with the customer via the communication network;

receiving customer voice data from the communication device associated with the customer via the communication network;

converting the customer voice data into customer VOIP data packets;

transmitting the customer VOIP data packets to the customer support agent computer system via the data network;

receiving, during the customer support call between the customer support agent computing system and the communication device associated with the customer, and from the customer support agent computer system, a request for data from a customer computing device associated with the customer, wherein the request is received via the data network;

receiving the requested data from the customer computing device associated with the customer via the data network, wherein the customer computing device is different than the communication device associated with the customer; and transmitting the requested data to the customer support agent computer system via the data network, wherein the requested data is not voice data.

11. The method as recited in claim 10, wherein the communication network comprises a telephone network.

12. The method as recited in claim 10, further comprising:
generating a recording of the customer support call; and
maintaining the recording in association with the customer support incident ticket.

13. The method as recited in claim 10, further comprising:
transmitting the data request via the data network to the customer computing device associated with the customer.

14. One or more memory storage devices comprising computer-executable instructions that, when executed, cause an incident management and routing service to:

receive voice-over-IP (VOIP) data packets from a communication device associated with a customer via a communication network, wherein the VOIP data packets indicate the nature of a customer support call;

generate a customer support incident ticket based at least in part on the received voice-over-IP data packets;

identify a customer support agent from among a plurality of customer support agents that are geographically distributed at facilities separate from a facility that includes the incident management and routing service;

associate the customer support incident ticket with the customer support agent, wherein the customer support agent is located at a location that is geographically distributed from the facility that includes the incident management and routing service and interacts with the incident management and routing service via an Internet connection;

receive, during a customer support call between the communication device associated with the customer and a computing system associated with the customer support agent, a request, via a data network, from the computing system associated with the customer support agent for non-voice data from a computing device associated with the customer, wherein the computing device associated with the customer is different than the communication device associated with the customer;

send, via the data network, the request to the computing device associated with the customer;

receive via the data network, the non-voice data from the computing device associated with the customer; and transmit, via the data network, the non-voice data to the computing system associated with the customer support agent.

15. The one or more memory storage devices as recited in claim 14, further comprising computer-executable instructions that, when executed, cause the incident management and routing service to:

maintain data associated with the customer support incident ticket;

identify pending customer support incident tickets;

maintain a profile associated with the customer support agent, the profile identifying a technical area of expertise associated with the customer support agent;

monitor availability of the customer support agent based at least in part on whether or not the customer support agent is logged on to a customer support application;

maintain routing rules;

automatically route the customer support incident ticket to the computing system associated with customer support agent based at least in part on the routing rules; and manage assignment of the customer support agent to the customer support incident ticket.

16. The one or more memory storage devices as recited in claim 15, further comprising computer-executable instructions that, when executed, cause the incident management and routing service to:

monitor the availability of the customer support agent based at least in part on the customer support agent being assigned to the customer support incident ticket.

17. The one or more memory storage devices as recited in claim 15, further comprising computer-executable instructions that, when executed, cause the incident management and routing service to:

coordinate data transmissions in support of the customer support call between the communication device associated with the customer and the computing system associated with the customer support agent in association with the customer support incident ticket.

18. The one or more memory storage devices as recited in claim 15, wherein the profile associated with the customer support agent further identifies a language spoken by the customer support agent.

19. The one or more memory storage devices as recited in claim 18, wherein the associating of the customer support incident ticket with the customer support agent is based, at least in part, on a comparison of the language spoken by the customer support agent and a preferred language associated with the customer support incident ticket.

* * * * *